United States Patent
Anscher

Patent Number: 6,018,851
Date of Patent: Feb. 1, 2000

[54] PRE-LOADABLE CORD LOCK

[75] Inventor: Joseph Anscher, Muttontown, N.Y.

[73] Assignee: National Molding Corp., Farmingdale, N.Y.

[21] Appl. No.: 09/140,917

[22] Filed: Aug. 26, 1998

[51] Int. Cl.[7] .................................................. F16G 11/00
[52] U.S. Cl. .......................................................... 24/115 G
[58] Field of Search .............................. 24/115 G, 136 R, 24/115 M, 136 K, 115 H

[56] References Cited

U.S. PATENT DOCUMENTS

| | | |
|---|---|---|
| 5,197,166 | 3/1993 | Meier et al. . |
| 5,361,461 | 11/1994 | Anscher . |
| 5,621,952 | 4/1997 | Frano . |
| 5,649,340 | 7/1997 | Ida . |
| 5,657,513 | 8/1997 | Takahashi . |
| 5,666,699 | 9/1997 | Takahashi . |
| 5,671,505 | 9/1997 | Anscher . |

Primary Examiner—James R. Brittain
Attorney, Agent, or Firm—Collard & Roe, PC

[57] ABSTRACT

A cord lock comprising an outer telescoping member having at least two side walls and a bottom wall, defining an interior cavity, and an inner telescoping member slidable within the cavity of the outer telescoping member. Both the inner and outer telescoping members have apertures extending through their side walls. The inner and outer telescoping members are biased against each other by biasing means such as a spring, so that the apertures are not aligned and are able to pinch a cord threaded through the apertures. There is at least one leg attached to the inner telescoping member and extending into the interior cavity of the outer telescoping member. The leg has a T-shaped free end. There is at least one flexible leg retaining means located within the outer telescoping member, which is adapted to lock the inner telescoping member into first and second locking positions. In the first locking position, the apertures on the inner and outer telescoping members are aligned for feeding a cord therethrough. In the second locking position, the apertures are not aligned to pinch the cord.

16 Claims, 10 Drawing Sheets

PRE-LOADABLE CORD LOCK

BACKGROUND OF THE INVENTION

1. Field of the Invention

This invention relates to a pre-loadable cord lock for use on athletic clothing, outerwear, backpacks and other items. In particular, the invention relates to a cord lock that can be easily preloaded by the manufacturer and subsequently easily actuated to grip one or more cords threaded therethrough.

2. The Prior Art

Cord locks are well known for gripping and retaining cords such as elastic cords on outerwear and luggage. These cord locks are typically made from a pair of telescoping members having apertures therethrough. One telescoping member is biased relative to the other so that their respective apertures are not aligned. In order to use the cord lock, it is necessary to load it by squeezing the two telescoping members together so that their respective apertures are aligned. The user must continue to apply pressure to hold the two members together in this aligned state while simultaneously threading the cord through the aperture. Once the cord is threaded, the user may release the pressure that is exerted on the two members. Because the two members are biased so that their apertures are misaligned, they will pinch the cord that has been threaded through the apertures so as to retain the cord in a fixed position.

Although this design has proven to be effective in holding and locking a cord, one disadvantage is that the user must continue to exert downward pressure to align the apertures of the two telescoping members while simultaneously threading the cord through the apertures. Because of the biasing force necessary to grip the cord is relatively strong, a relatively large amount of finger pressure must be applied to align the apertures. Thus, it can be cumbersome to simultaneously thread the cord through the apertures while maintaining the apertures in an aligned position. This is especially true during assembly of a large number of units.

Another shortcoming of the prior art is that there is a risk that the lock can be inadvertently disengaged by someone squeezing the two telescoping members together, thereby relieving the tension on the cord and allowing it to slip. To overcome this, the biasing means of the prior art cord locks is very strong. However, as described above, loading the cord lock against such strong biasing means can be very cumbersome and can lead to carpal tunnel syndrome if done repeatedly.

To overcome these drawbacks, a cord lock that can be preloaded at the time of manufacture is disclosed in U.S. Pat. No. 5,671,505 to Anscher. This cord lock has two telescoping members biased against each other by a spring. The internal member has lateral arms that snap into shoulders on the outer member to lock the cord lock into a loaded position. To release the inner member, the shoulders are pressed inward, which releases the arms of the inner member and allows the inner member to extend out of the outer member, thus misaligning the apertures containing the cord.

This device has the advantage that it will not be inadvertently re-loaded after assembly by pressing on the inner member, because the inner member must be pressed below the surface of the outer member in order for the arms to lock into the shoulders.

While this device has numerous advantages, the recessed small head of the inner member can cause difficulty in loading, and lead to increased stress on the assembler's fingers.

SUMMARY OF THE INVENTION

It is therefore an object of the present invention to provide an improved cord lock that is easy to preload and actuate.

It is another object of the present invention to provide a cord lock that cannot be inadvertently re-loaded once it is actuated.

It is yet another object of the present invention to provide a cord lock that is simple and inexpensive to manufacture.

These and other objects are accomplished by a cord lock comprising an outer telescoping member having at least two side walls and a bottom wall, defining an interior cavity, and an inner telescoping member slidable within the cavity of the outer telescoping member. Both the inner and outer telescoping members have apertures extending through their side walls. The inner and outer telescoping members are biased against each other by biasing means such as a spring, so that the apertures are not aligned and are able to pinch a cord threaded through the apertures. There is at least one leg attached to the inner telescoping member and extending into the interior cavity of the outer telescoping member. The leg has a T-shaped free end and is not vertical, but is outwardly biased or sloped.

There is at least one leg retaining means located within the outer telescoping member, which is adapted to lock the inner telescoping member into first and second locking positions. In the first locking position, the apertures on the inner and outer telescoping members are aligned for feeding a cord therethrough. In the second locking position, the apertures are not aligned to pinch the cord.

In a preferred embodiment, the leg retaining means comprises at least one downwardly extending arm connected at a top portion to a side wall of the outer telescoping member. The front side of the top portion slopes toward the center of the cavity. Below the top portion is a flexible vertical lower portion. A ledge is formed between the sloped top portion and vertical lower portion. The flexible vertical lower portion has a notched foot directed away from the center of the outer telescoping member.

Pressing the inner telescoping member into the outer telescoping member causes the leg to slide along the front side of the top portion and around the ledge to lock into the first locking position where a cord can be threaded through the apertures on the top and bottom pieces without having to keep pressure on the inner telescoping member. Further downward pressure on the inner telescoping member causes the leg to slide down the lower portion, around the notched foot and up the rear side of the arm to rest in the second locking position, where the apertures are not aligned and a cord can be held in place. As the leg slides around the notched foot, the vertical lower portion flexes and allows the leg enough clearance to pass around the bottom of the arm. This feature, in addition to the outwardly sloped or biased nature of the leg, prevents it from being inadvertently re-loaded back into the first locking position, since there is no means for bending the flexible lower portion outward to allow clearance for the leg to pass back around to the front side of the arm.

The bottom side of the outer telescoping member has an upwardly extending shoulder element located beneath the arm. The shoulder element has an outwardly sloped side wall that bends the leg and lower vertical portion of the arm outward as the leg slides down the lower portion and forces it around the notched foot.

Preferably, the outer side of the arm has a ledge on the top portion that traps the leg during its upward movement along the outer side of the arm and prevents further upward movement of the inner telescoping member. This is a safety feature to prevent the inner and outer telescoping members from becoming disengaged and becoming lost.

There are preferably two legs and two arms, disposed on opposite sides of the spring. A post extending up from the center of the bottom side of the outer telescoping member between the shoulder elements and is surrounded by the spring when the inner telescoping member is pressed into the outer telescoping member.

The inner telescoping member has a top cap that extends beyond the circumference of the outer telescoping member. This cap prevents the inner telescoping member from being pressed beyond a certain point into the outer telescoping member and over-stressing the parts. The enlarged cap also makes it easier to move the cord lock between the two locking positions.

In an alternative embodiment, the T-shaped free end has an outwardly facing ledge and the leg retaining means comprises a downwardly extending flexible arm connected at a top portion to a side wall of the outer telescoping member. The arm has an inwardly facing ledge on its front side and an outwardly facing ledge on its rear side.

Pressing the inner telescoping member down into the outer telescoping member causes the leg to slide along the front side of the arm until the ledge on the leg connects with the ledge on the front surface of the arm to lock the leg into the first locking position. At this point the apertures are aligned. Further pressure on the leg causes the leg to slide down the arm, around the free end and up the rear side of the arm until the ledge on the rear surface of the arm connects with the T-shaped free end to lock the leg into the second locking position, where the apertures are not aligned and the cord is pinched between the apertures. As the leg travels from the first locking position to the second locking position, the arm flexes and allows enough clearance room for the leg to pass around the free end of the arm.

To further enable the leg to slide down and around the end of the arm, the bottom side of the outer telescoping member has an upwardly extending shoulder element located in the center of the cord lock and has an outwardly sloped side wall. This side wall biases the leg outward as the leg slides down the arm and forces it around the flexible arm to the rear side of the arm where it remains the second locking position. As with the first embodiment, it is impossible to inadvertently place the cord lock back into the first locking position because there is no way to flex the arm backward and bias the leg inwardly enough to travel back around the arm.

In another alternative embodiment, the T-shaped free end of the outwardly-biased leg has a hook-shaped cross-section that faces outwardly and the leg retaining means comprises a downwardly extending arm mounted at a top portion to a side wall of the outer telescoping member. Pressing the inner telescoping member into the outer telescoping member causes the leg to slide down the front side of the arm until the free end of the leg catches on the free end of the arm and locks the leg into the first locking position. Further downward pressure on the inner telescoping member causes the leg to slide around the free end of the arm, which flexes to let the leg pass, and up the rear side of the arm to place the leg in the second locking position. Again, the sloped shoulder elements on the bottom side of the outer telescoping member further bias the leg as it travels down the arm and allow it to slide around and up the rear side of the arm. This configuration prevents inadvertent return of the leg to the first locking position. However, the apertures may be temporarily re-aligned for adjusting the cord by merely pressing on the inner telescoping member until the apertures line up. Releasing the pressure causes the cord lock to automatically return to the second locking position.

In yet another alternative embodiment, the T-shaped free end of the leg has at least one outwardly-facing hook disposed thereon and the leg retaining means comprises a downwardly extending flexible arm connected to a side wall of the outer telescoping member. The arm has a groove cut into the lower end that corresponds to the shape of the hook. Pressing the inner telescoping member down into the outer telescoping member causes the leg to slide along the front side of the arm until the hook catches the groove to place the cord lock into the first locking position. Further downward pressure on the inner telescoping member causes the leg to slide past the groove, around the lower end and up the rear side of the arm to form the second locking position. The arm flexes to accommodate the travel of the leg around the bottom of the arm and up the rear side.

Again, the leg is able to slide past the groove and around the lower end of the arm by the biasing power of the sloped shoulder element on the bottom side of the outer telescoping member along with the inherent outward slope of the leg itself.

Preferably, there are two hooks, one hook located on each side of the T-shaped free end. As with the other embodiments, this configuration prevents the leg from inadvertently returning to the first locking position.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denotes similar elements throughout the several views.

DETAILED DESCRIPTION OF THE PREFERRED EMBODIMENT

Figure 1:
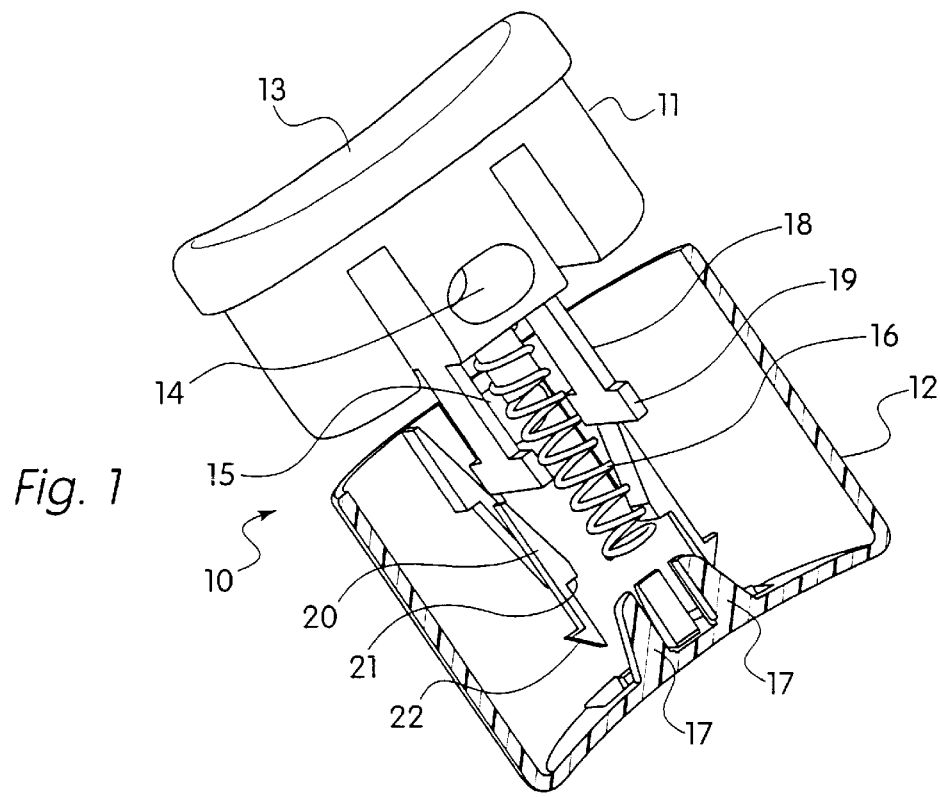
FIG. 1 shows a perspective view in partial cross section of the cord lock according to the invention.
Figure 2:
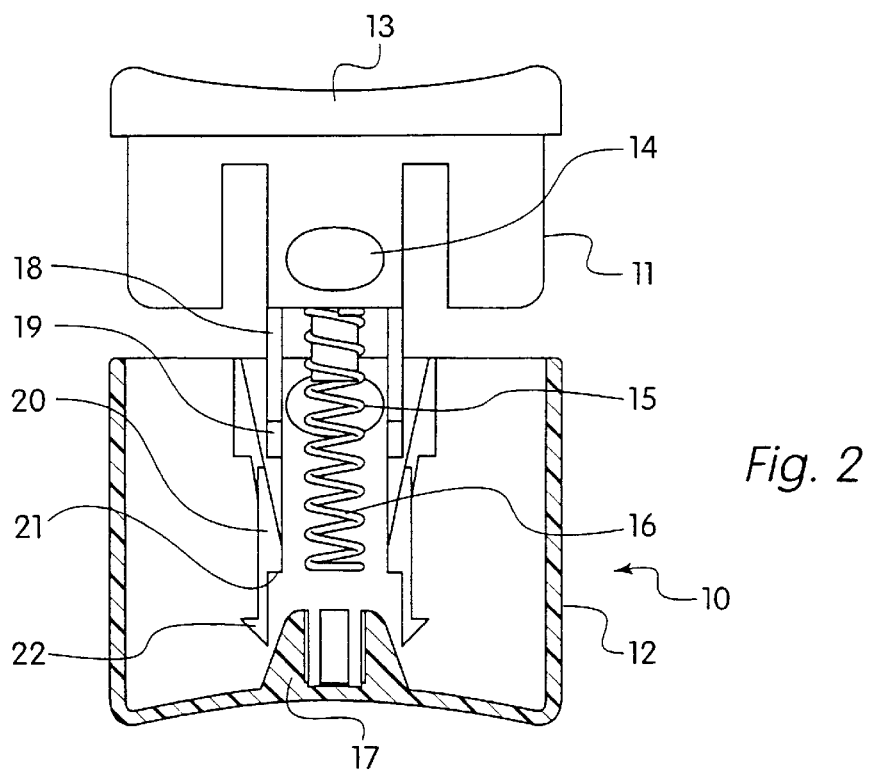
FIG. 2 shows a front cross-sectional view of the cord lock shown in FIG. 1.
Figure 3:
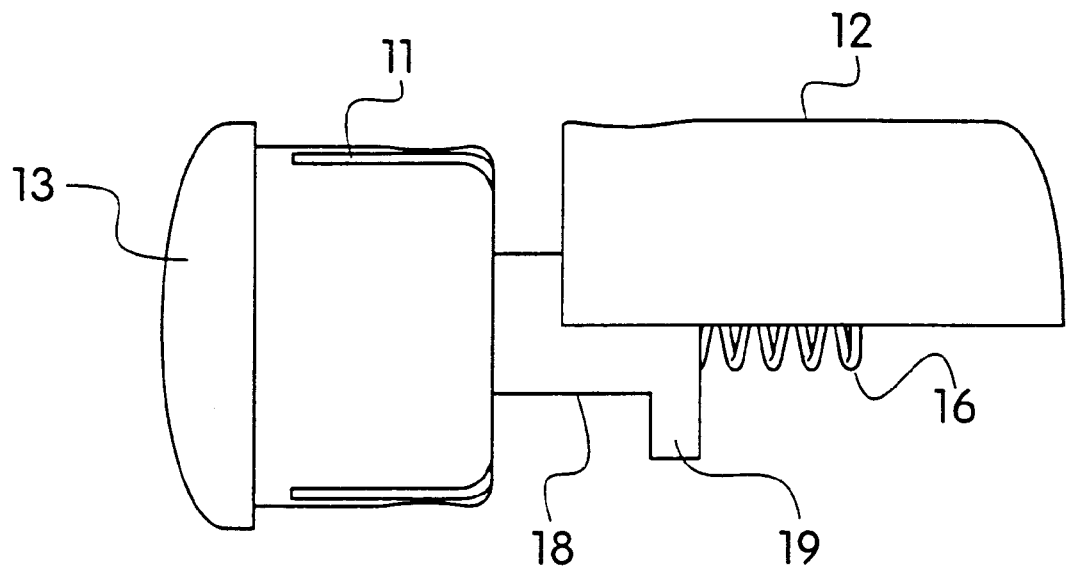
FIG. 3 shows a side view in partial cross section of the cord lock shown in FIG. 1.
Figure 4:
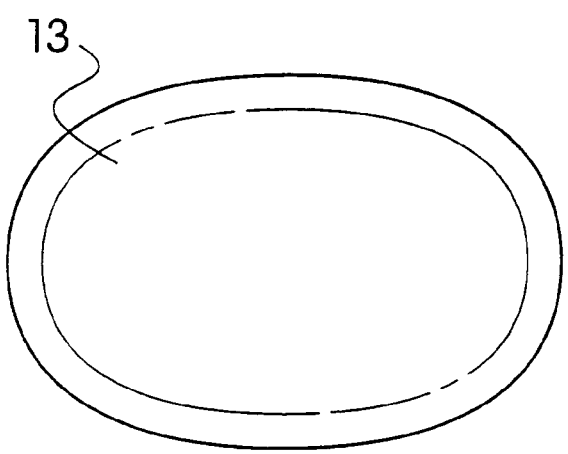
FIG. 4 shows a top view of the cord lock shown in FIG. 1.

Referring now in detail to the drawings and, in particular, FIGS. 1–4, there is shown a preferred embodiment of the cord lock according to the invention. Cord lock 10 comprises an inner telescoping member 11 that is insertable into an outer telescoping member 12. Inner telescoping member 11 has an enlarged cap 13 and an aperture 14 that extends through the entire member 11. Outer telescoping member 12 has a corresponding aperture 15 that allows a cord to be threaded therethrough when apertures 14 and 15 are aligned.

Telescoping members 11 and 12 are biased against each other by a coiled spring 16 which is attached to inner telescoping member 11 and slides over a post on the bottom of outer telescoping member 12 when the two members are pressed together. Spring 16 keeps apertures 14 and 15 from being aligned when cord lock 10 is at rest. This non-alignment allows a cord to be pinched between the two apertures.

Inner telescoping member 11 has two legs 18 that extend downward and outward into outer telescoping member 12 and which have T-shaped free ends 19. Legs 18 are resilient and can be biased toward the center of outer telescoping member 12.

Outer telescoping member 12 has two longitudinally extending arms 20, which correspond to legs 18 and lock legs 18 into one of two locking positions: a loaded position and a resting position. Arms 20 have an inwardly sloped top portion that ends in a ledge 21. Below ledge 21 is a flexible vertical bottom portion that ends with a harpoon-shaped foot 22. Foot 22 creates an outwardly facing ledge.

Figure 5:
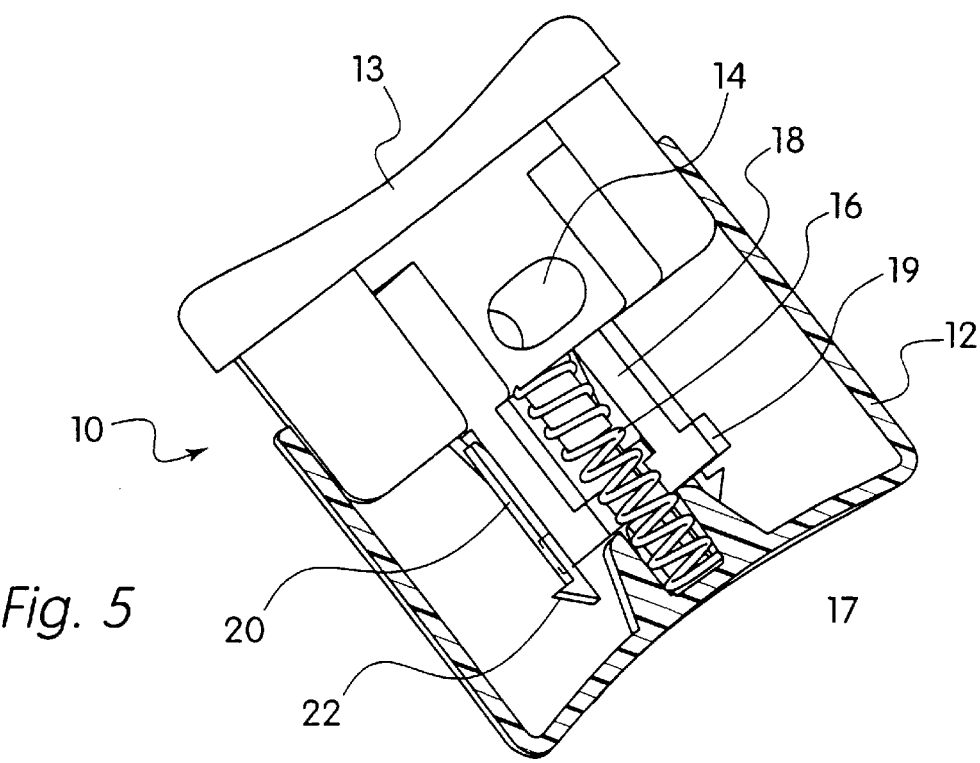
FIG. 5 shows a perspective view in partial cross-section of the cord lock of FIG. 1 in the first locking position.
Figure 6:
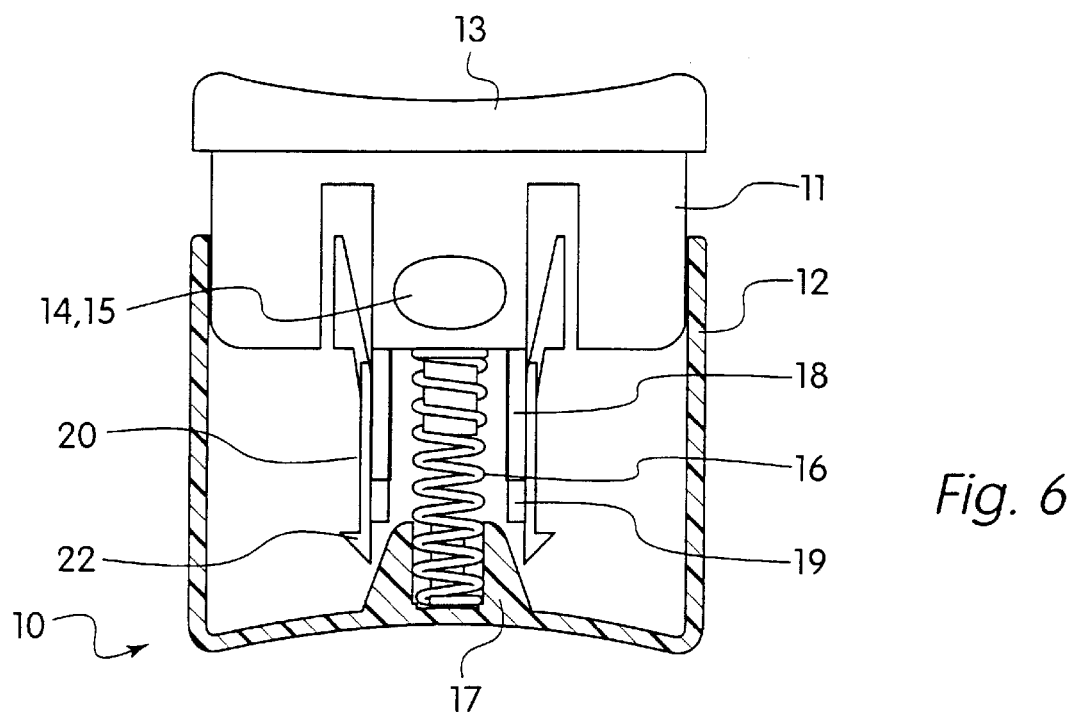
FIG. 6 shows a front cross-sectional view of the embodiment shown in FIG. 5.
Figure 7:
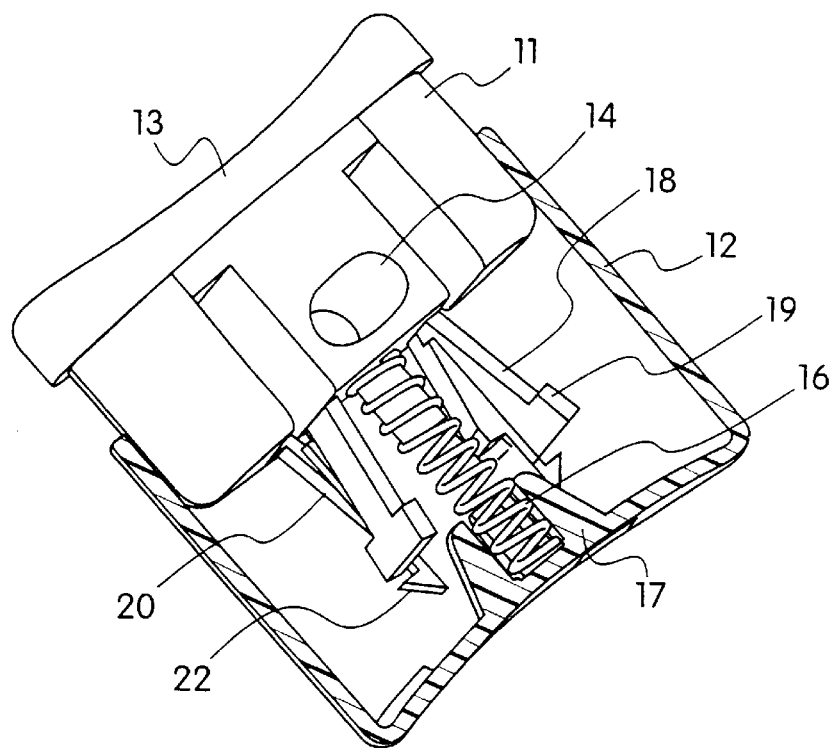
FIG. 7 hows a perspective view in partial cross-section of the embodiment shown in FIG. 1 in the second locking position.
Figure 8:
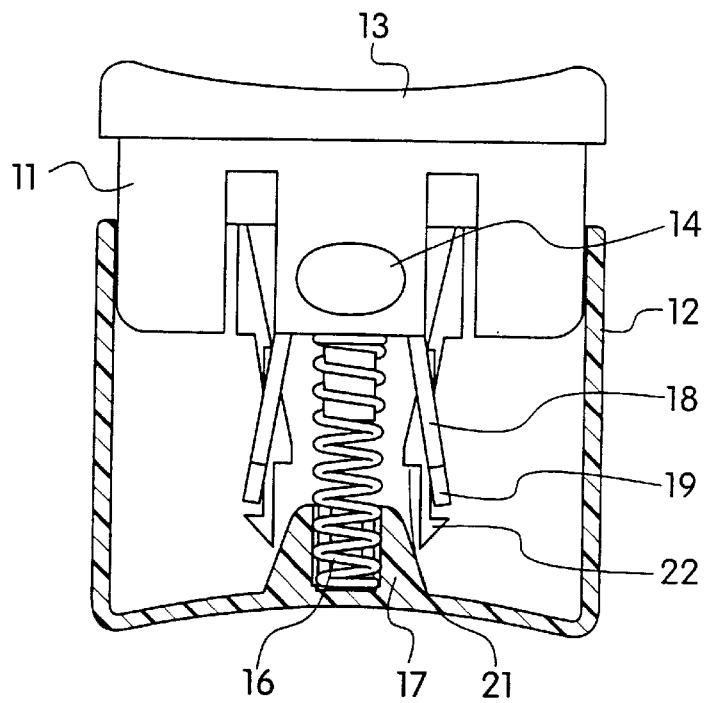
FIG. 8 shows a front cross-sectional view of the embodiment shown in FIG. 7.

To use cord lock 10, inner telescoping member is inserted into outer telescoping member as shown in FIG. 1, and is pressed downward, causing legs 18 to slide down the sloped top portion of ledge 21, biasing them inward, until legs 18 become locked into a first locking position shown in FIGS. 5 and 6. In the first locking position, T-shaped free ends 19 of legs 18 are locked underneath ledge 21 of arms 20 keep apertures 14 and 15 aligned to allow a cord to be threaded therethrough. Cord lock 10 remains in this locking position until further downward pressure causes legs 18 to pass down the flexible lower vertical portion of arms 19 and around foot 22 into the second locking position, as shown in FIGS. 7 and 8.

To assist the transition from the first locking position to the second, the bottom surface of outer telescoping member 12 has a shoulder element 17, which protrudes upward and has outwardly sloping shoulders. Shoulder element 17 guides legs 18 downwardly and outwardly, pushing legs 18 and flexing arms 19 so that legs 18 move around feet 22 into the second locking position. The flexible lower vertical portion of arm 19 bends in response to this motion by legs 18, and flexes to allow legs 18 to pass around foot 22.

In this second locking position, legs 18 are no longer biased inward and are at rest in an outwardly slanted position. Foot 22 prevents legs 18 from returning to the first locking position under ledge 21. In addition, the slanted configuration of legs 18 also makes it impossible for them to be biased inward sufficiently to pass around foot 22 to return to the first locking position. There is also no means for the flexible lower portion of arm 19 to bend to allow legs 18 to pass back around to the first locking position. In the second locking position, apertures 14 and 15 are no longer aligned and can pinch a cord that has been threaded therethrough. The cord can still be adjusted by pressing downward on inner telescoping member 11 until apertures 14 and 15 are aligned. Releasing the pressure causes cord lock 10 to immediately return to the second locking position.

Figure 9:
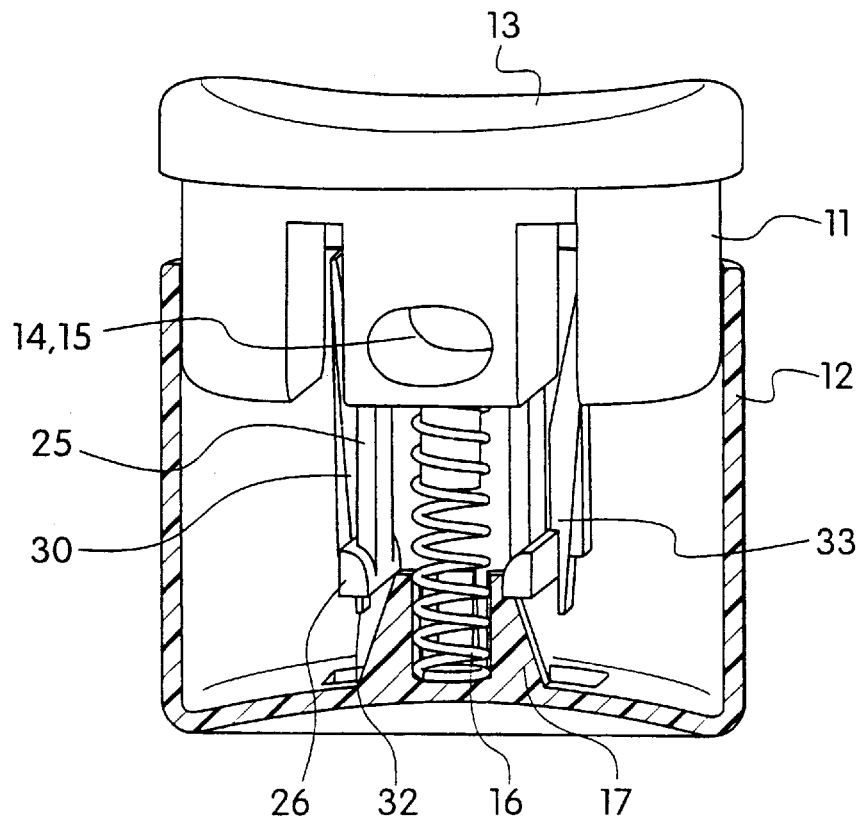
FIG. 9 shows a perspective view in partial cross-section of an alternative embodiment of the invention.
Figure 10:
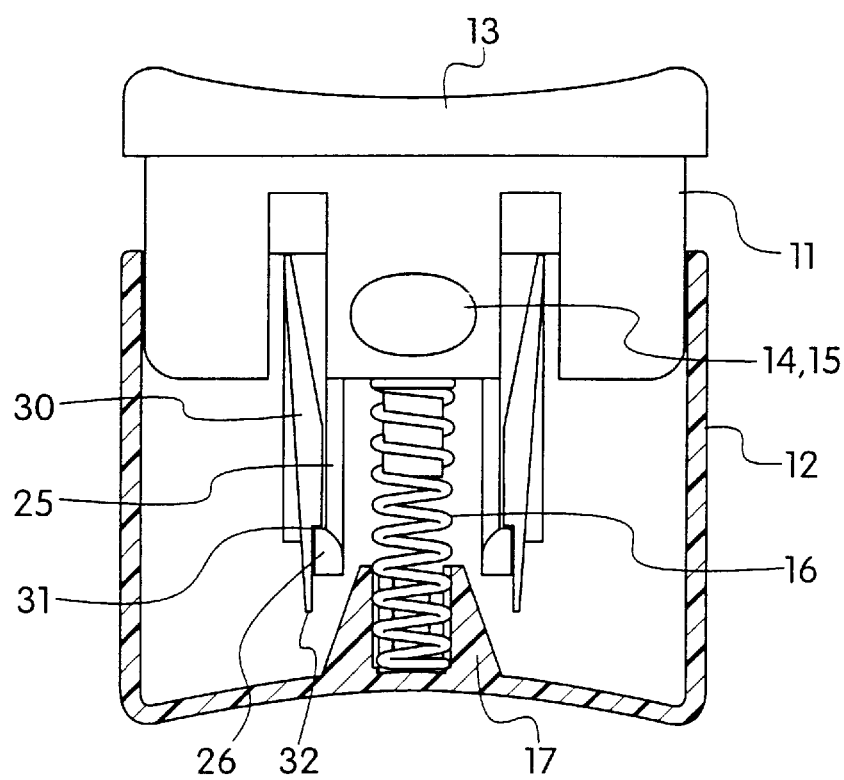
FIG. 10 shows a front cross-sectional view of the embodiment shown in FIG. 9.
Figure 11:
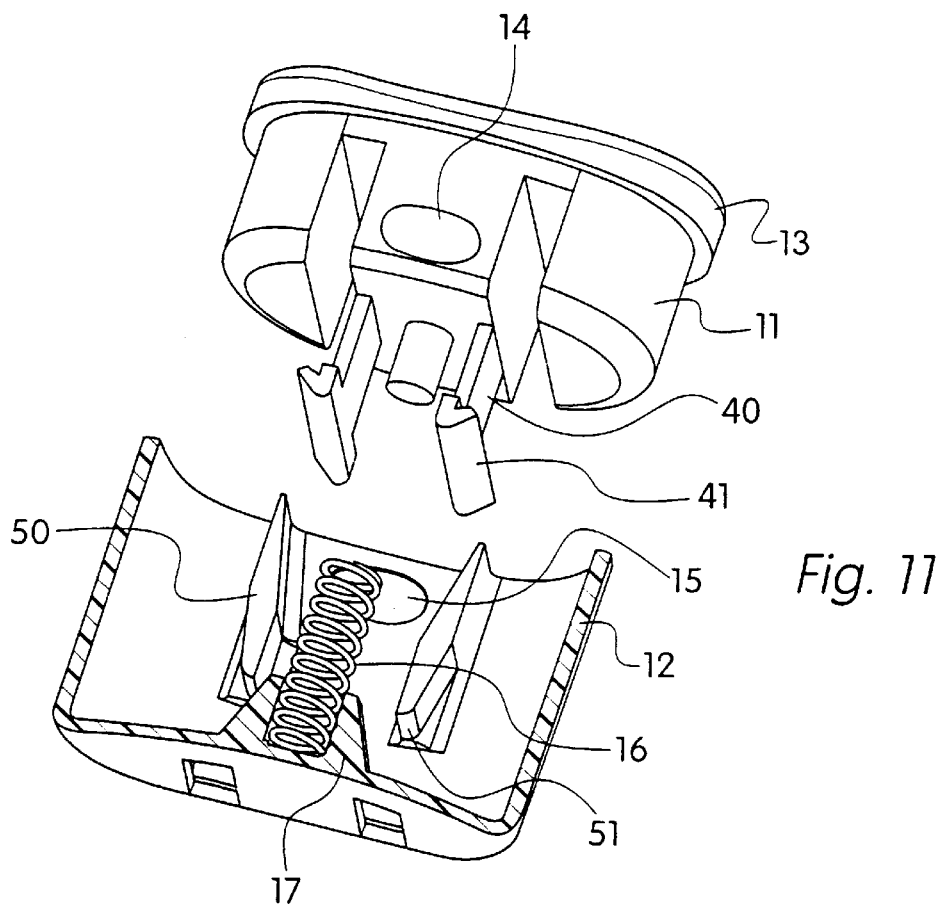
FIG. 11 shows a perspective view in partial cross-section of another alternative embodiment of the invention in a disassembled state.

A second embodiment of cord lock 10 is shown in FIGS. 9 and 10. In this embodiment, T-shaped free end 26 of leg 25 has an outwardly-protruding ridge that mates with an inwardly-extending ledge 31 on flexible arms 30 of outer telescoping member 12. This is the first locking position. Further pressure on inner telescoping member 12 causes leg 25 to slide down arm 30, around foot 32 via the help of shoulder element 17 and the flexing of foot 32 and up the outer side of arm 30 into the second locking position.

There is an upward ledge 33 on the outer side of arm 30 that prevents upward movement of leg 25 beyond the level of ledge 33. This ensures that leg 25 will not travel upward beyond ledge 33 and release inner telescoping member 11 from outer telescoping member 12. In addition, there is no means for forcing leg 25 to flex in such a manner so as to allow clearance for leg 25 to pass back around to the first locking position. Ledge 33 is located at a position such that apertures 14 and 15 are not aligned when the bottom of leg 25 contacts ledge 33. This way, a cord can be readjusted without the risk that cord lock 10 will become stuck in an aligned position.

Figure 12:
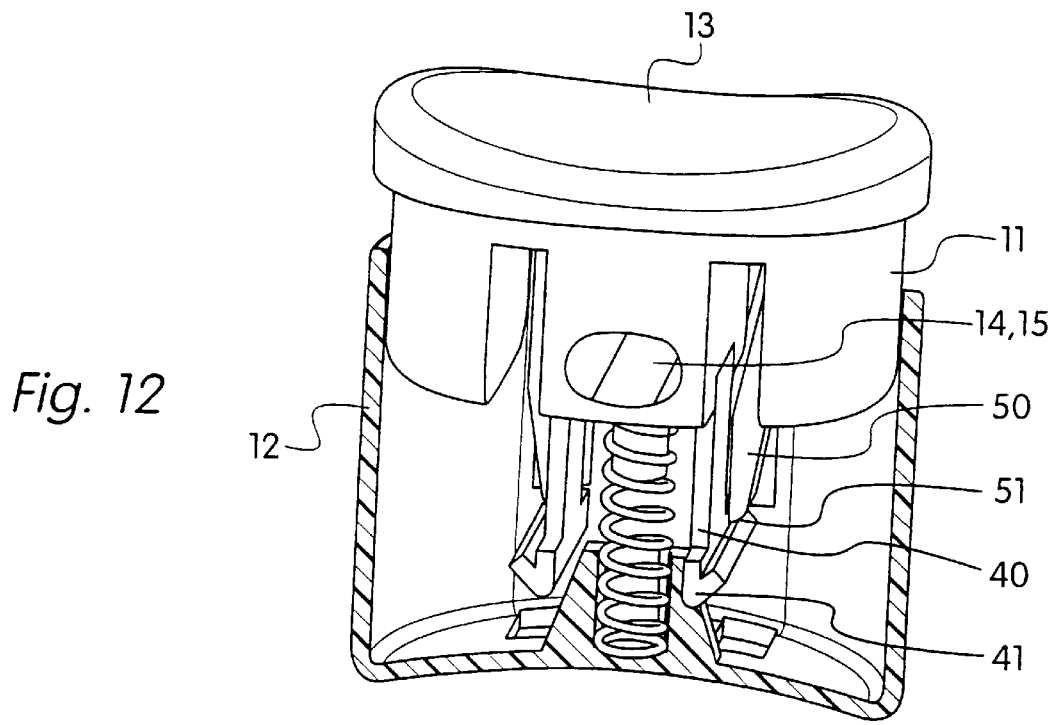
FIG. 12 shows a perspective view in partial cross section of the embodiment of FIG. 11 in the first locking position.
Figure 13:
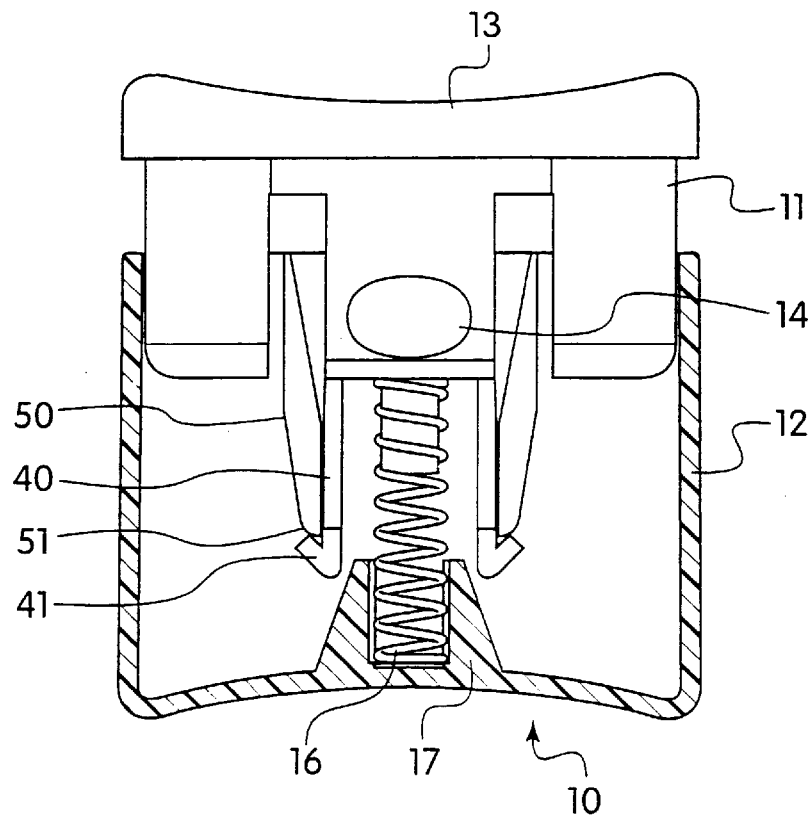
FIG. 13 shows a front cross-sectional view of the embodiment shown in FIG. 12.
Figure 14:
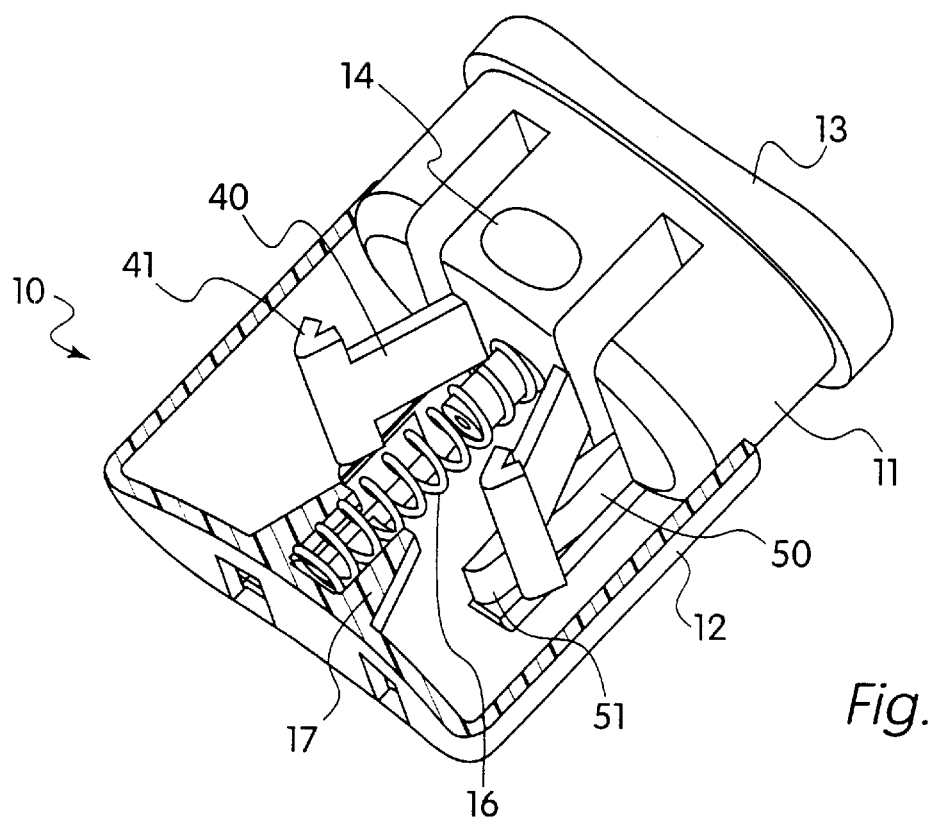
FIG. 14 shows a perspective view in partial cross section of the embodiment shown in FIG. 11 in the second locking position.
Figure 15:
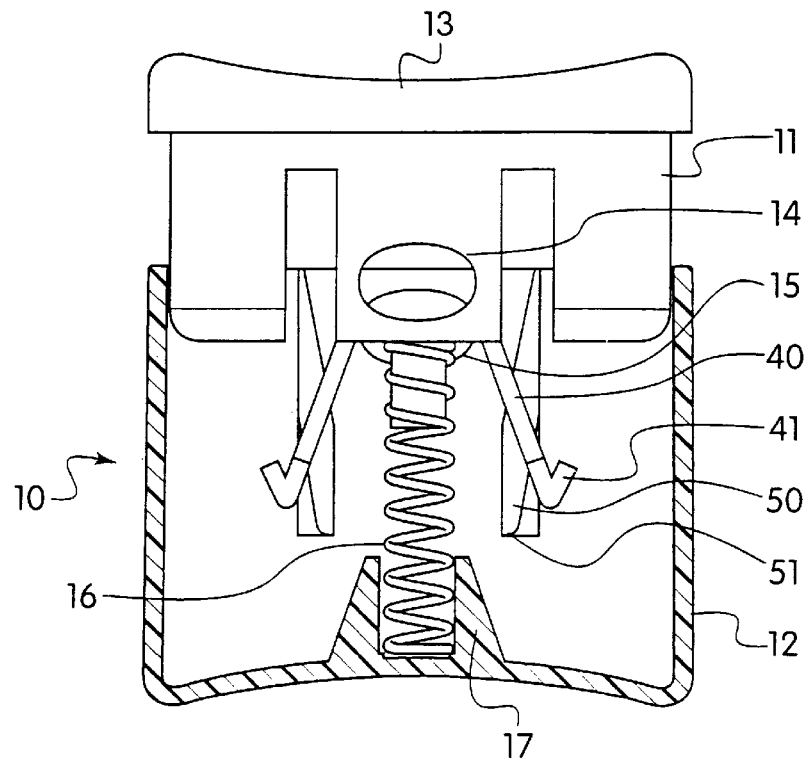
FIG. 15 shows a front cross sectional view of the embodiment shown in FIG. 14.
Figure 16:
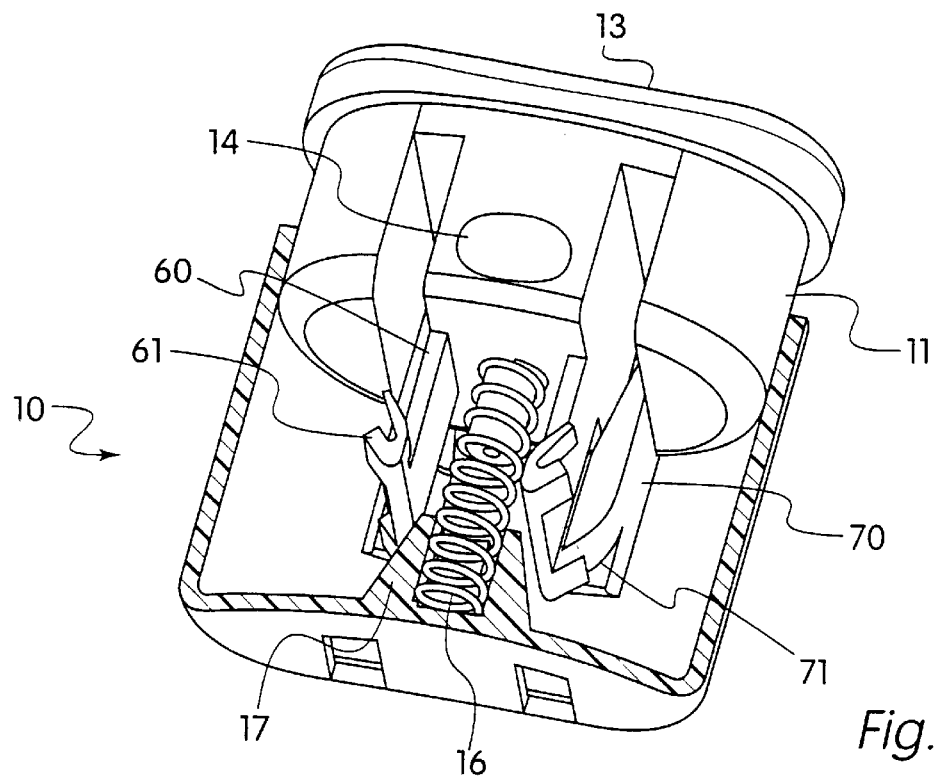
FIG. 16 shows a perspective view in partial cross section of yet another embodiment of the invention in the first locking position.
Figure 17:
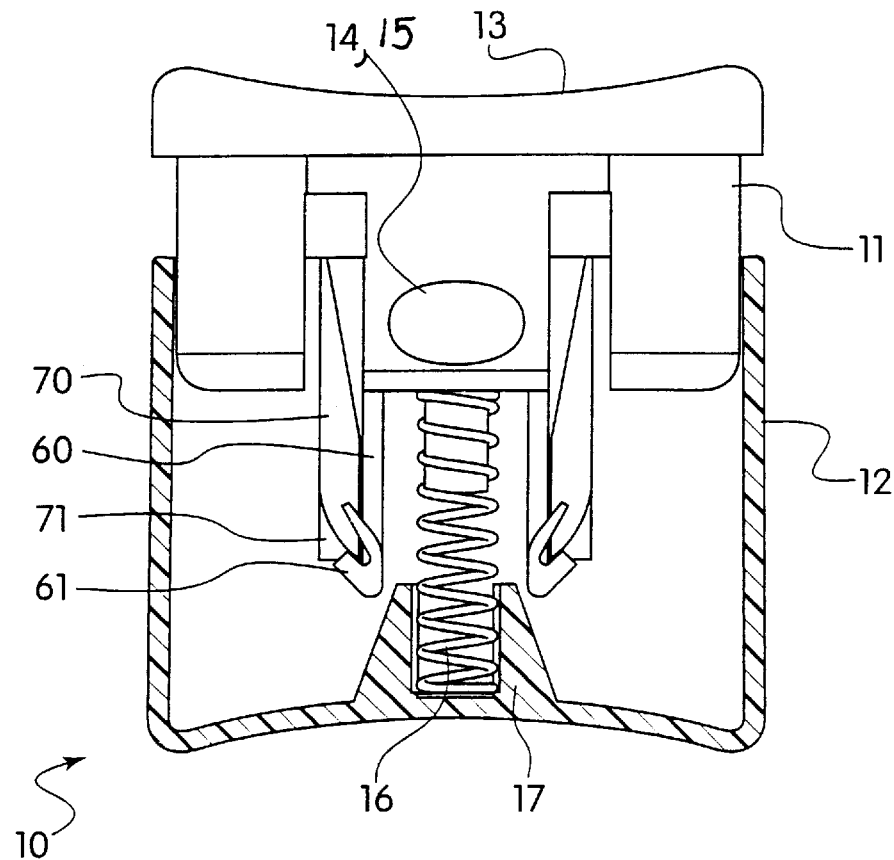
FIG. 17 shows a front cross-sectional view of the embodiment shown in FIG. 16.
Figure 18:
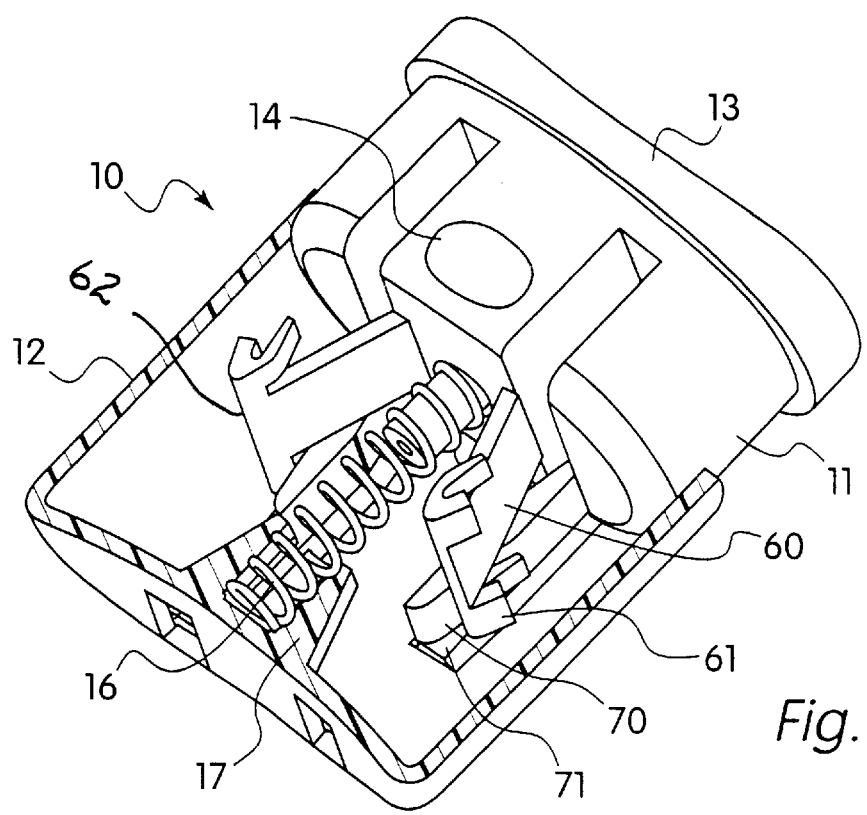
FIG. 18 shows a perspective view in partial cross section of the embodiment shown in FIG. 16 in the second locking position.
Figure 19:
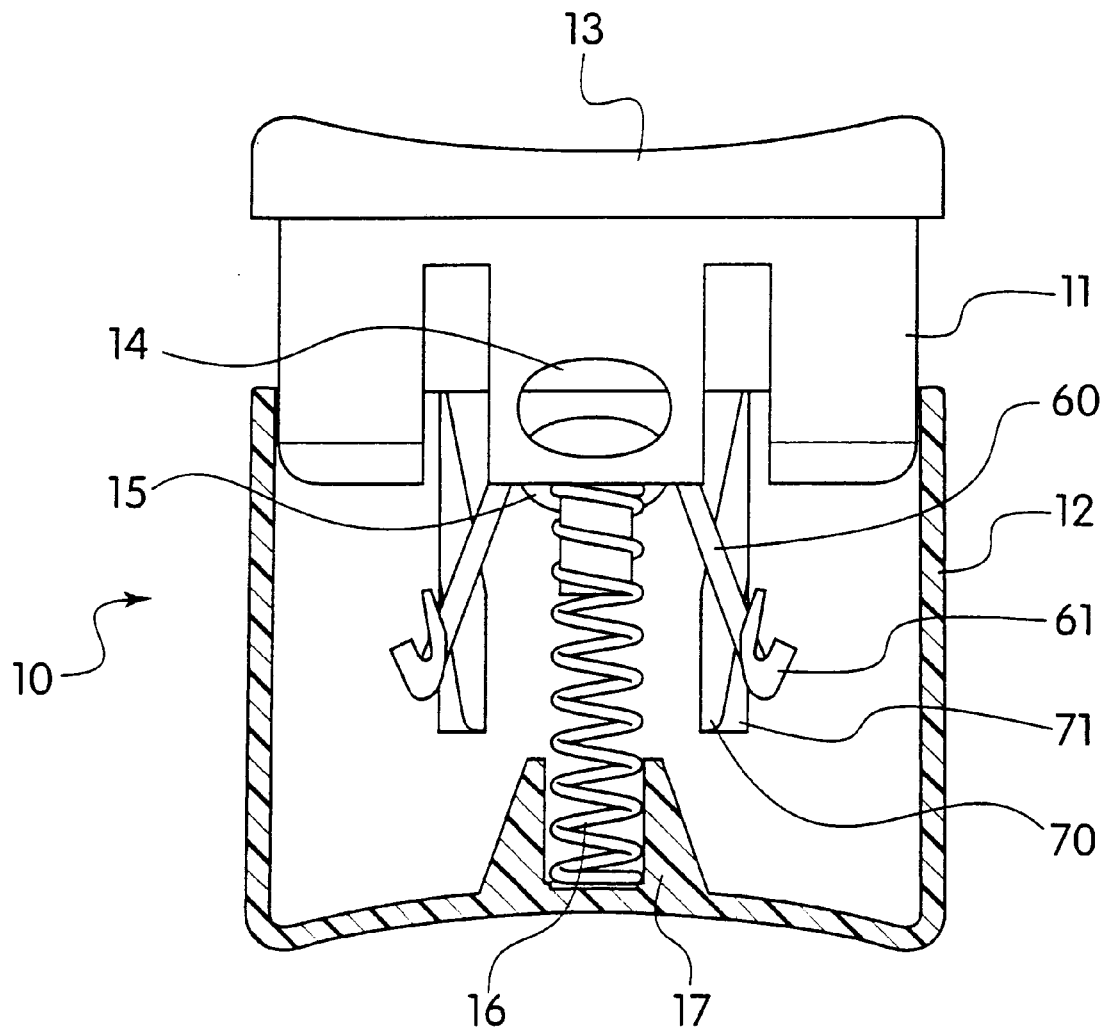
FIG. 19 shows a front cross-sectional view of the embodiment shown in FIG. 18.

Another alternative embodiment of cord lock 10 is shown in FIGS. 11–15. In this embodiment, legs 40 have a T-shaped free end 41 which has a hook-shaped cross section that aims outwardly. Arms 50 have a free end 51 that is shaped to fit within the hook-shaped cross section of free end 41 when inner telescoping member 11 is pressed into outer telescoping member 12, as shown in FIGS. 12 and 13. In this position, cord lock 10 is in the first locking position with apertures 14 and 15 being aligned. Further downward pressure on inner telescoping member 11 causes legs 40 to slide down around free end 51 of arms 50 and up the opposite side of arms 50 to rest in the second locking position, shown in FIGS. 14 and 15. Arms 50 flex in response to this motion of legs 40 and allow enough room for legs 40 to pass around free end 51. Legs 40 are outwardly sloped so that they cannot inadvertently return to the first locking position once the second locking position is achieved. Shoulder elements 17 assist in bringing legs 40 around and up the outer side of arms 50 and in causing arms 50 to bend in response to this motion.

Yet another embodiment of cord lock 10 is shown in FIGS. 16–19. In this embodiment, legs 60 have two hooks 61 on either side of T-shaped free end 62. Arms 70 have a cutout 71 on their free end that corresponds to the shape of hooks 61, so that pressing inner telescoping member downward causes hooks 61 to catch in cutout 71 and lock cord lock 10 into the first locking position, shown in FIGS. 16 and 17. Further pressure on inner telescoping member 10 causes hooks 61 to slide out of cutout 71, around the free end of arms 70 and up the opposite side to rest in the second locking position, shown in FIGS. 18 and 19, where apertures 14 and 15 are not aligned. Arms 70 flex in response to this motion and provide sufficient clearance for legs 60 to travel around the free end of arms 70. Again, legs 60 are outwardly sloped so that they cannot inadvertently return to the first locking position once the second locking position has been achieved. Furthermore, there is no means for causing arms 70 to flex back in such a way as to create sufficient clearance for legs 60 to travel back around arms 70.

Accordingly, while only a few embodiments of the present invention have been shown and described, it is obvious that many changes and modifications may be made thereunto without departing from the spirit and scope of the invention.

What is claimed is:

1. A loadable cord lock comprising:
   an outer telescoping member having at least two side walls and a bottom wall, defining an interior cavity, and an aperture extending through said two side walls;
   an inner telescoping member slidable within the cavity of said outer telescoping member and having an aperture extending therethrough;
   means for biasing said inner and outer members so that said apertures are not aligned, to pinch a cord threaded through said apertures;
   at least one leg attached to the inner telescoping member and extending into the interior cavity of the outer telescoping member, said leg having a T-shaped free end and being biased away from the center of the cord lock;
   at least one leg retaining means located within the outer telescoping member, such that pressing the inner telescoping member into the outer telescoping member causes the leg retaining means to lock the inner telescoping member in a first locking position where the apertures on the inner and outer telescoping members are aligned for feeding a cord therethrough, and further pressure on the inner telescoping member causes the inner telescoping member to lock in a second locking position, where the apertures are not aligned, to pinch the cord.

2. The cord lock according to claim 1, wherein the biasing means is a spring connected to the inner telescoping member.

3. The cord lock according to claim 2, further comprising a post extending up from the center of the bottom side of the outer telescoping member, said spring surrounding said post when said inner telescoping member is pressed into said outer telescoping member.

4. The cord lock according to claim 1, wherein the inner telescoping member has a top cap that extends beyond the inner circumference of the outer telescoping member.

5. A loadable cord lock comprising:
   an outer telescoping member having at least two side walls and a bottom wall, defining an interior cavity, and an aperture extending through said two side walls;
   an inner telescoping member slidable within the cavity of said outer telescoping member and having an aperture extending therethrough;
   means for biasing said inner and outer members so that said apertures are not aligned, to pinch a cord threaded through said apertures;
   at least one leg attached to the inner telescoping member and extending into the interior cavity of the outer telescoping member, said leg having a T-shaped free end; and being biased away from the center of the cord lock,
   at least one leg retaining means located within the outer telescoping member, said leg retaining means comprising at least one downwardly extending arm connected at a top portion to a side wall of the outer telescoping member and having a front side and a rear side, the front side of said top portion sloping toward the center of the cavity, said arm having a flexible vertical lower portion, wherein a ledge is formed between said sloped top portion and vertical lower portion, said vertical lower portion having a notched foot directed away from the center of the outer telescoping member,
   wherein pressing the inner telescoping member into the outer telescoping member causes the leg to slide along the front side of the top portion and around the ledge to lock into a first locking position where the apertures on the inner and outer telescoping members are aligned for feeding a cord therethrough.

6. The cord lock according to claim 2, wherein further pressure on the inner telescoping member causes the leg to slide down the flexible lower portion, bend the flexible lower portion outward, slide around the notched foot and up the rear side of the arm to rest in a second locking position where the apertures are not aligned, to pinch the cord.

7. The cord lock according to claim 5, wherein the bottom side of the outer telescoping member has an upwardly extending shoulder element located beneath the arm, said shoulder element having an outwardly sloped side wall that bends the leg and the lower vertical portion of the arm as the leg slides down the lower portion and forces it around the notched foot.

8. The cord lock according to claim 5, wherein the rear side of the arm has a ledge on the top portion, said ledge trapping the leg and preventing further upward movement of the inner telescoping member.

9. The cord lock according to claim 5, wherein there are two legs and two arms.

10. A loadable cord lock comprising:
    an outer telescoping member having at least two side walls and a bottom wall, defining an interior cavity, and an aperture extending through said two side walls;
    an inner telescoping member slidable within the cavity of said outer telescoping member and having an aperture extending therethrough;
    means for biasing said inner and outer members so that said apertures are not aligned, to pinch a cord threaded through said apertures;
    at least one leg attached to the inner telescoping member and extending into the interior cavity of the outer telescoping member, said leg having a T-shaped free end and being biased away from the center of the cord lock, said T-shaped free end forming an outwardly facing ledge;
    at least one leg retaining means located within the outer telescoping member, said leg retaining means comprising a downwardly extending flexible arm connected at a top portion to a side wall of the outer telescoping member, said arm having a free end, a front side and a rear side and having an inwardly facing ledge on the front side and an outwardly facing ledge on the rear side,
    wherein pressing the inner telescoping member down into the outer telescoping member causes the leg to slide along the arm until the ledge on the leg connects with the ledge on the front surface of the arm to lock the leg into a first locking position where the apertures on the inner and outer telescoping members are aligned for feeding a cord therethrough, and wherein further pressure on the leg causes the leg to slide down the arm, bend the arm outward, slide around the free end of the arm and up the rear side of the arm until the ledge on the rear surface of the arm connects with the T-shaped free end to lock the leg into a second locking position where the apertures are not aligned, to pinch the cord.

11. The cord lock according to claim 10, wherein the bottom side of the outer telescoping member has an upwardly extending shoulder element located beneath the arm, said shoulder element having an outwardly sloped side wall that bends the leg and the arm as the leg slides down the arm and forces it around the free end of the arm.

12. A loadable cord lock comprising:

an outer telescoping member having at least two side walls and a bottom wall, defining an interior cavity, and an aperture extending through said two side walls;

an inner telescoping member slidable within the cavity of said outer telescoping member and having an aperture extending therethrough;

means for biasing said inner and outer members so that said apertures are not aligned, to pinch a cord threaded through said apertures;

at least one leg attached to the inner telescoping member and extending into the interior cavity of the outer telescoping member, said leg having a T-shaped free end and being biased away from the center of the cord lock, said T-shaped free end of the leg having a hook-shaped cross section;

at least one leg retaining means located within the outer telescoping member, said leg retaining means comprising a downwardly extending flexible arm mounted at a top portion to a side wall of the outer telescoping member, said arm having a free end, a front side and a rear side, wherein pressing the inner telescoping member into the outer telescoping member causes the leg to slide down the front side of the arm until the free end of the leg catches on the free end of the arm and locks the leg into a first locking position where the apertures on the inner and outer telescoping members are aligned for feeding a cord therethrough, and wherein further downward pressure on the inner telescoping member causes the leg to slide around the free end of the arm, bend the arm outward, and slide up the rear side of the arm to place the leg in a second locking position where the apertures are not aligned, to pinch the cord.

13. The cord lock according to claim 12, wherein the bottom side of the outer telescoping member has an upwardly extending shoulder element located beneath the arm, said shoulder element having an outwardly sloped side wall that bends the leg and the arm as the leg slides down the front side of the arm and forces it around the free end of the arm.

14. A loadable cord lock comprising:

an outer telescoping member having at least two side walls and a bottom wall, defining an interior cavity, and an aperture extending through said two side walls;

an inner telescoping member slidable within the cavity of said outer telescoping member and having an aperture extending therethrough;

means for biasing said inner and outer members so that said apertures are not aligned, to pinch a cord threaded through said apertures;

at least one leg attached to the inner telescoping member and extending into the interior cavity of the outer telescoping member, said leg having a T-shaped free end and being biased away from the center of the cord lock, said T-shaped free end of the leg having at least one outwardly-facing hook disposed thereon;

at least one leg retaining means located within the outer telescoping member, said leg retaining means comprising a downwardly extending flexible arm connected to a side wall of the outer telescoping member, said arm having a front side, a rear side, a lower end and a groove cut into the lower end, said groove corresponding to the shape of the hook, wherein pressing the inner telescoping member into the outer telescoping member causes the leg to slide along the front side of the arm until the hook catches the groove forming a first locking position where the apertures on the inner and outer telescoping members are aligned for feeding a cord therethrough, and wherein further downward pressure on the inner telescoping member causes the leg to slide past the groove, bend the lower end of the arm, slide around the lower end and up the rear side of the arm to form a second locking position where the apertures are not aligned, to pinch the cord.

15. The cord lock according to claim 14, wherein the bottom side of the outer telescoping member has an upwardly extending shoulder element located beneath the arm, said shoulder element having an outwardly sloped side wall that bends the leg and the arm as the leg slides down the lower portion and forces it around the lower end.

16. The cord lock according to claim 14, wherein there are two hooks, each hook located on an opposite end of the T-shaped free end of the leg.

* * * * *